United States Patent
Hwang

[11] Patent Number: 5,970,102
[45] Date of Patent: Oct. 19, 1999

[54] CIRCUIT AND METHOD FOR DETECTING FREQUENCY CORRECTION BURST IN TDMA DIGITAL MOBILE COMMUNICATION SYSTEM

[75] Inventor: Seong-Kyu Hwang, Seoul, Rep. of Korea

[73] Assignee: SamSung Electronics Co., Ltd., Kyungki-do, Rep. of Korea

[21] Appl. No.: 08/917,061

[22] Filed: Aug. 25, 1997

[30] Foreign Application Priority Data

Aug. 24, 1996 [KR] Rep. of Korea .............. 96-35462

[51] Int. Cl.$^6$ ............................................. H03D 1/00
[52] U.S. Cl. ........................................ 375/340; 370/350
[58] Field of Search .................................. 375/329, 340, 375/371; 329/304; 370/516, 503, 350

[56] References Cited

U.S. PATENT DOCUMENTS

| | | |
|---|---|---|
| 4,483,000 | 11/1984 | Yamamoto et al. . |
| 4,829,543 | 5/1989 | Borth et al. . |
| 4,852,090 | 7/1989 | Borth . |
| 4,887,050 | 12/1989 | Borth et al. . |
| 4,941,155 | 7/1990 | Chuang et al. . |
| 5,005,189 | 4/1991 | Hackett, Jr. . |
| 5,077,531 | 12/1991 | Takeuchi et al. ............... 329/304 |
| 5,241,688 | 8/1993 | Arora . |
| 5,303,262 | 4/1994 | Johnson . |
| 5,390,216 | 2/1995 | Bilitza et al. . |
| 5,416,800 | 5/1995 | Frank . |
| 5,479,451 | 12/1995 | Eldering et al. . |
| 5,528,597 | 6/1996 | Gerszberg et al. . |
| 5,533,028 | 7/1996 | Hita de la torre et al. . |
| 5,579,319 | 11/1996 | Daniel . |
| 5,621,766 | 4/1997 | Bakke et al. .................... 375/340 |
| 5,651,015 | 7/1997 | Bain . |
| 5,680,418 | 10/1997 | Croft et al. .................... 375/346 |
| 5,717,722 | 2/1998 | Mori ............................. 375/326 |

Primary Examiner—Don N. Vo
Assistant Examiner—Lenny Jiang
Attorney, Agent, or Firm—Robert E. Bushnell, Esq.

[57] ABSTRACT

A circuit for detecting a frequency correction burst in a TDMA digital mobile communication system. The circuit comprises a first multiplier for inputting I-channel data modulated by a continuous phase shift key and multiplying the inputted I-channel data by a sine wave frequency of the frequency correction burst to produce a first channel signal I1(nT); a second multiplier for inputting Q-channel data modulated by the continuous phase shift key and multiplying the inputted Q-channel data by the sine wave frequency of the frequency correction burst to produce a second channel signal Q1(nT); a low-pass filter for lowpass-filtering the first and second channel signals I1(nT) and Q1(nT) to produce first and second filtered channel signals I2(nT) and Q2(nT); a first energy estimation unit for estimating energies of the first and second channel signals I1(nT) and Q1(nT), respectively to generate a first instantaneous signal energy $E_p(nT)$; a second energy estimation unit for estimating energies of the first and second channel signals I1(nT) and Q1(nT), respectively to generate a second instantaneous signal energy $E_q(nT)$; a normalization unit for normalizing the first instantaneous signal energy $E_p(nT)$ to the second instantaneous signal energy $E_q(nT)$ to generate a normalized signal G(nT); and a burst discriminator for detecting only a frequency correction burst from the normalized signal G(nT).

20 Claims, 8 Drawing Sheets

CIRCUIT AND METHOD FOR DETECTING FREQUENCY CORRECTION BURST IN TDMA DIGITAL MOBILE COMMUNICATION SYSTEM

CLAIM FOR PRIORITY

This application makes reference to, incorporates the same herein, and claims all benefits accruing under 35 U.S.C. §119 from an application for CIRCUIT AND METHOD FOR DETECTING FREQUENCY CORRECTION BURST IN TDMA DIGITAL MOBILE COMMUNICATION SYSTEM earlier filed in the Korean Industrial Property Office on the 24$^{th}$ of Aug. 1996, and there duly assigned Ser. No. 35462/1996, a copy of which application is annexed hereto.

BACKGROUND OF THE INVENTION

1. Technical Field

The present invention relates to a time division multiple access (TDMA) digital mobile communication system, and more particularly, to a circuit in a mobile station for detecting a frequency correction burst, which is periodically transmitted from a base station to achieve frequency adjustment and time slot synchronization between the base station and the mobile station in the TDMA digital mobile communication system.

2. Related Art

Modem digital mobile communication system include a central base station fixedly located at a predetermined terrestrial site with a predetermined radio coverage to establish communication with a plurality of mobile stations geographically spaced from the central base station by means of the time division multiple access (TDMA) technique.

In a TDMA communication system, digital information intended for a single receiver, for example, a single mobile station is modulated onto a single TDMA signal transmitted to all mobile stations. Multiple users of a single frequency signal are accommodated by allowing access to the TDMA signal by each individual user at different time intervals. The timed access is divided into groups of multiple time frames with each time frame corresponding to an allotted time interval for one radio frequency burst containing digital information for an individual receiver. Contemporary TDMA communication systems are disclosed, for example, in U.S. Pat. No. 4,483,000 for Circuit For Eliminating Spurious Components Resulting From Burst Control In A TDMA System issued to Yamamoto et al., U.S. Pat. No. 4,829,543 for Phase-Coherent TDMA Quadrature Receiver For Multipath Fading Channels issued to Borth et al., U.S. Pat. No. 4,852,090 for TDMA Communications System With Adaptive Equalization issued to Borth et al., U.S. Pat. No. 4,941,155 for Method And Circuitry For Symbol Timing And Frequency Offset Estimation In Time Division Multiple Access Radio Systems issued to Chuang et al., U.S. Pat. No. 5,303,262 for Method And Apparatus For Triggering Measurements From A TDMA Signal issued to Johnson, U.S. Pat. No. 5,533,028 for Communications Subsystem Between Base Stations And Base Station Controllers In Burst Communications Systems issued to Hita de la Torre et al., U.S. Pat. No. 5,528,597 for Autonomous Synchronization Of Base Stations In A Digital Wireless Radiotelephone Network issued to Gerszberg et al., U.S. Pat. No. 5,579,319 for Receiver Path Selection Based On Burst-Type In A Time Division Multiple Access Receiver issued to Daniel, and U.S. Pat. No. 5,651,015 for Apparatus And Method For Synchronization And Error Detection Of Received Digital Data Bursts In A TDM/TDMA System issued to Bain.

In order to establish communication between the base station and the mobile station in a TDMA digital mobile communication system, frequency adjustment and time slot synchronization must be achieved. One contemporary technique for frequency adjustment and time slot synchronization between the base station and the mobile station using a frequency correction burst is disclosed in U.S. Pat. No. 4,887,050 for Frequency Control Apparatus And Method For A Digital Radio Receiver issued to Borth et al., U.S. Pat. No. 5,241,688 for Frequency And Time Slot Synchronization Using Adaptive Filtering issued to Arora, U.S. Pat. No. 5,390,216 for Synchronization Method For A Mobile Radiotelephone issued to Bilitza et al., and U.S. Pat. No. 5,416,800 for Mobile Radio Receiver For A Radio Transmission System issued to Frank. The frequency correction burst is a pure tone sine wave at 67.5 kHz, consisting of 148 samples, that is transmitted from the base station periodically in time slot zero of a data stream, and is subsequently detected at the mobile station to estimate a frequency offset between the carrier frequencies of the base station and the mobile station in order to achieve time slot synchronization between the base station and the mobile station.

Contemporary techniques for frequency adjustment and time slot synchronization, as I have observed however, require complex and cost prohibitive circuitry to detect the frequency correction burst contained in a TDMA signal, even when the mobile communication channel exhibits multiple path fading characteristics. Moreover, the required circuitry often fails to reliably detect the frequency correction burst, and requires a lot of time to detect the frequency correction burst.

SUMMARY OF THE INVENTION

Accordingly, it is therefore an object of the present invention to provide simplified circuitry for detecting a frequency correction burst in a TDMA digital mobile communication system.

It is also an object to provide a circuit and a process for rapid frequency and time slot synchronization between a fixed base station and a mobile station in a TDMA digital mobile communication system.

It is another object to provide a circuit and a process for detecting a frequency correction burst in a TDMA digital mobile communication system, and thereby minimizing the effects of a multiple path fading signal a doppler shift frequency generated by the speed of the mobile station so that a failure in detecting the frequency correction burst can be reduced.

It is still another object to provide a circuit and a method for detecting a frequency correction burst in a TDMA digital mobile communication system in which a signal is processed in a baseband of a mobile station, even if a tolerance of a local oscillator frequency used in a radio frequency receiver is incorrect, so that time necessary for detecting the frequency correction burst can be reduced.

These and other objects of the present invention can be achieved by a frequency correction burst detection circuit in a time division multiple access (TDMA) digital mobile communication system which comprises a first multiplier for inputting I-channel data modulated by a continuous phase shift key and multiplying the input I-channel data by a sine wave frequency of the frequency correction burst to produce a first channel signal I1(nT); a second multiplier for inputting Q-channel data modulated by the continuous phase shift key and multiplying the input Q-channel data by the sine wave frequency of the frequency correction burst to produce a second channel signal Q1(nT); a low-pass filter for filtering the first and second channel signals I1(nT) and Q1(nT) to produce first and second filtered signals I2(nT) and Q2(nT), respectively; a first energy estimation unit for estimating energies of the first and second filtered signals I2(nT) and Q2(nT) to produce a first instantaneous signal energy $E_p(nT)$; a second energy estimation unit for estimating energies of the first and second signals I1(nT) and Q1(nT) to produce a second instantaneous signal energy $E_q(nT)$; a normalization unit for normalizing the first instantaneous signal energy $E_p(nT)$ output from the first energy estimation unit to the second instantaneous signal energy $E_q(nT)$ output from the second energy estimation unit to produce a normalized signal G(nT); and a burst discriminator for detecting the frequency correction burst from the normalized signal G(nT).

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
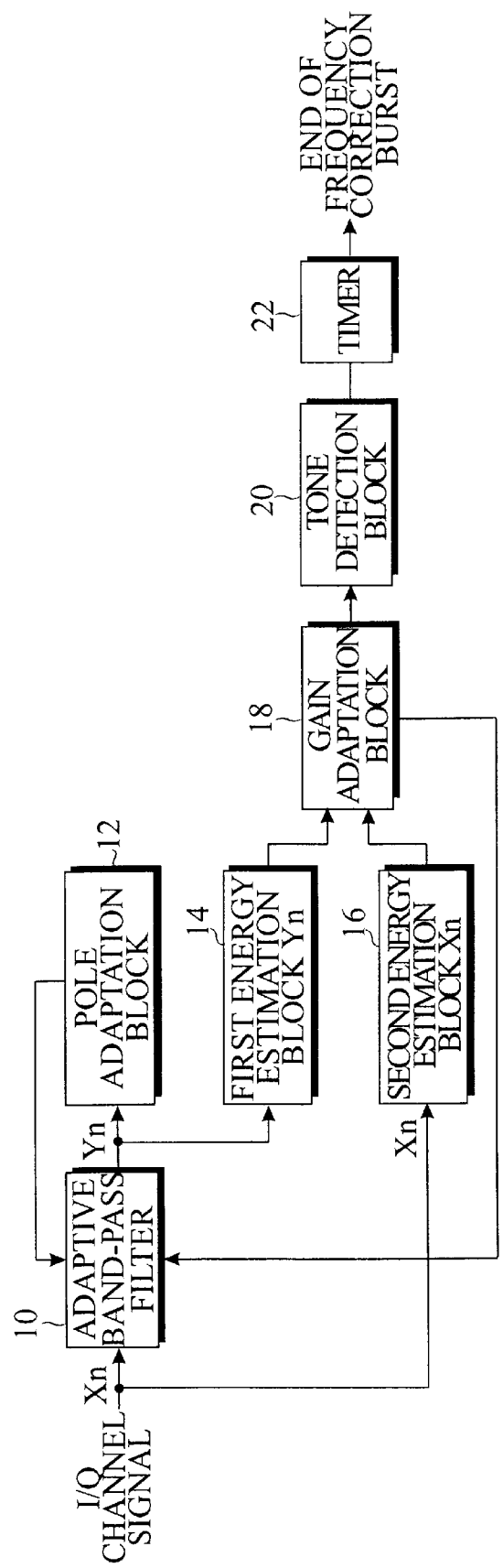
FIG. 1 illustrates a contemporary circuit for detecting a frequency correction burst in a TDMA digital mobile communication system.

Referring now to the drawings and particularly to FIG. 1, which illustrates a contemporary circuit for detecting a frequency correction burst signal in order to adjust the frequency synchronization between a fixed base station and a mobile station in a TDMA communication system. As shown in FIG. 1, the circuit includes an adaptive band-pass filter 10 coupled to process one of the two baseband Quadrature signals, the I and Q channel signal sampled at one sample per bit time from a receiver (not shown) of a mobile station (i.e., radiotelephone), a pole adaptation block 12, a first energy estimation block Yn14, a second energy estimation block Xn16, a gain adaptation block 18, a tone detection block 20, and a timer 22.

Adaptive band-pass filter 10 filters one of the I and Q channel signals modulated by continuous phase shift key of a baseband in order to produce a band-filtered signal Yn which is produced to the pole adaptation block 12 and the first energy estimation block 14. The signal output from the adaptive band-pass filter 10 is labeled Yn. The filtered signal is given in equation (1). Both the gain and the pole of this filter are adaptive. The pole of the filter 10 is moved so that the pass-band of the filter 10 encompasses the received signal. An instantaneous frequency of the band-filtered signal is estimated in the energy estimation block 14, and then is fed back to a gain adaptation block 18 to the adaptive band-pass filter 10.

$$y_{n+1}=b_r x_{n+1}+a_n y_n+(-ro^2)y_{n-1} \tag{1}$$

The energy estimation block 14 estimates the energy of the signal yn band-filtered from the adaptive band-pass filter 10 by following equation (2) in order to produce the energy provided to the gain adaptation block 18.

$$E(y)_{n+1}=(1-a_e)Ey_n+a_e y_n^2+1 \tag{2}$$

The second energy estimation block 16 estimates the energy of an input signal $X_n$ by following equation (3).

$$E(x)_{n+1}=(1-a_e)E(x)_n+a_e x_{n+1}^2 \tag{2}$$

The gain adaptation block 18 compares the energy $E(x)_{n+1}$ estimated from the second energy estimation block 16 with the energy $E(y)_{n+1}$ estimated from the first energy estimation block 14 so as to adapt the gain and provide the adapted gain to a tone detection block 20. The adapted gain signal is also fed back to the adaptive band-pass filter 10 to control the gain value of the filter 10. Tone detection block 20 determines whether or not a tone signal is detected from the adapted gain signal. When the tone signal is detected from the tone detection block 20, a timer 22 detects a frequency correction burst completion time index, thereby completing the frequency correction burst.

The contemporary technique for detecting the frequency correction burst in a TDNIA digital mobile communication system, as I have discussed earlier, requires complex circuitry including a complicated adaptive band-pass filter in order to detect the frequency correction burst, even when the mobile communication channel exhibits multiple path fading characteristics. Since the pole adaption is block 12 and the gain adaption block 18 are additionally required to adapt the pole and the gain of the adaptive band-pass filter 10, hardware becomes complicated and a large amount of calculation to process the digital signal is required. In addition, since the frequency tolerance of the local oscillator used in a radio frequency (RF) receiver and a doppler shift frequency generated by the speed of the mobile station are not regarded, there is a problem in that the frequency correction burst cannot be reliably detected, and in that a lot of time is required to detect the frequency correction burst.

Figure 2:
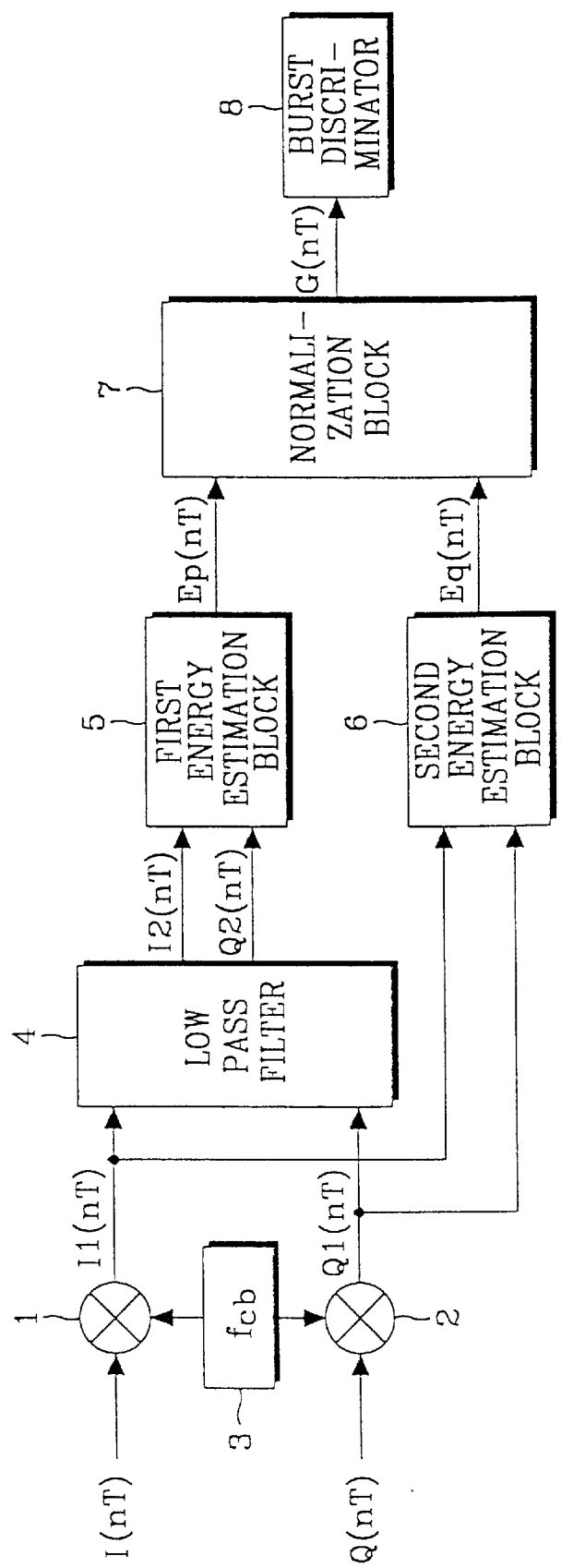
FIG. 2 illustrates a simplified circuit for detecting a frequency correction burst in a TDMA digital mobile communication system constructed according to the principles of the present invention.

Turning now to FIG. 2 which illustrates a simplified circuit for detecting a frequency correction burst in a TDMA digital mobile communication system constructed according to the principles of the present invention. As shown in FIG. 2, the simplified circuit includes a frequency generator 3 for generating a sine wave of the frequency correction burst, a pair of multipliers 1 and 2, a low-pass filter 4, a first energy estimation block 5, a second energy estimation block 6, a normalization block 7, and a burst discriminator 8.

Frequency generator 3 generates a sine wave frequency of the frequency correction burst. The first multiplier 1 receives I channel data modulated by a continuous phase shift key and multiplies the input I channel data by the sine wave frequency of the frequency correction burst in order to produce a first multiplied signal I1(nT). The second multiplier 2 receives Q channel data modulated by the continuous phase shift key and multiplies the inputted Q channel data by the sine wave frequency of the frequency correction burst in order to produce a second multiplied signal Q1(nT). The low pass filter 4 lowpass filters the signals I1(nT) and Q1(nT), thereby outputting signals I2(nT) and Q2(nT).

Next, the first energy estimation block 5 estimates energies of the signals I2(nT) and Q2(nT) output from the low pass filter 4 to produce a first instantaneous signal energy $E_p(nT)$. The second energy estimation block 6 estimates energies of the signals I1(nT) and Q1(nT) from multipliers 1 and 2, respectively to produce a second instantaneous signal energy $E_q(nT)$. The normalization block 7 normalizes the first instantaneous signal energy $E_p(nT)$ output from the first energy estimation block 5 to the second instantaneous signal energy $E_q(nT)$ output from the second energy estimation block 6 to produce a normalized signal G(nT). A burst discriminator 8 detects the frequency correction burst from the signal G(nT) normalized by the normalization block 7.

Figure 3A:
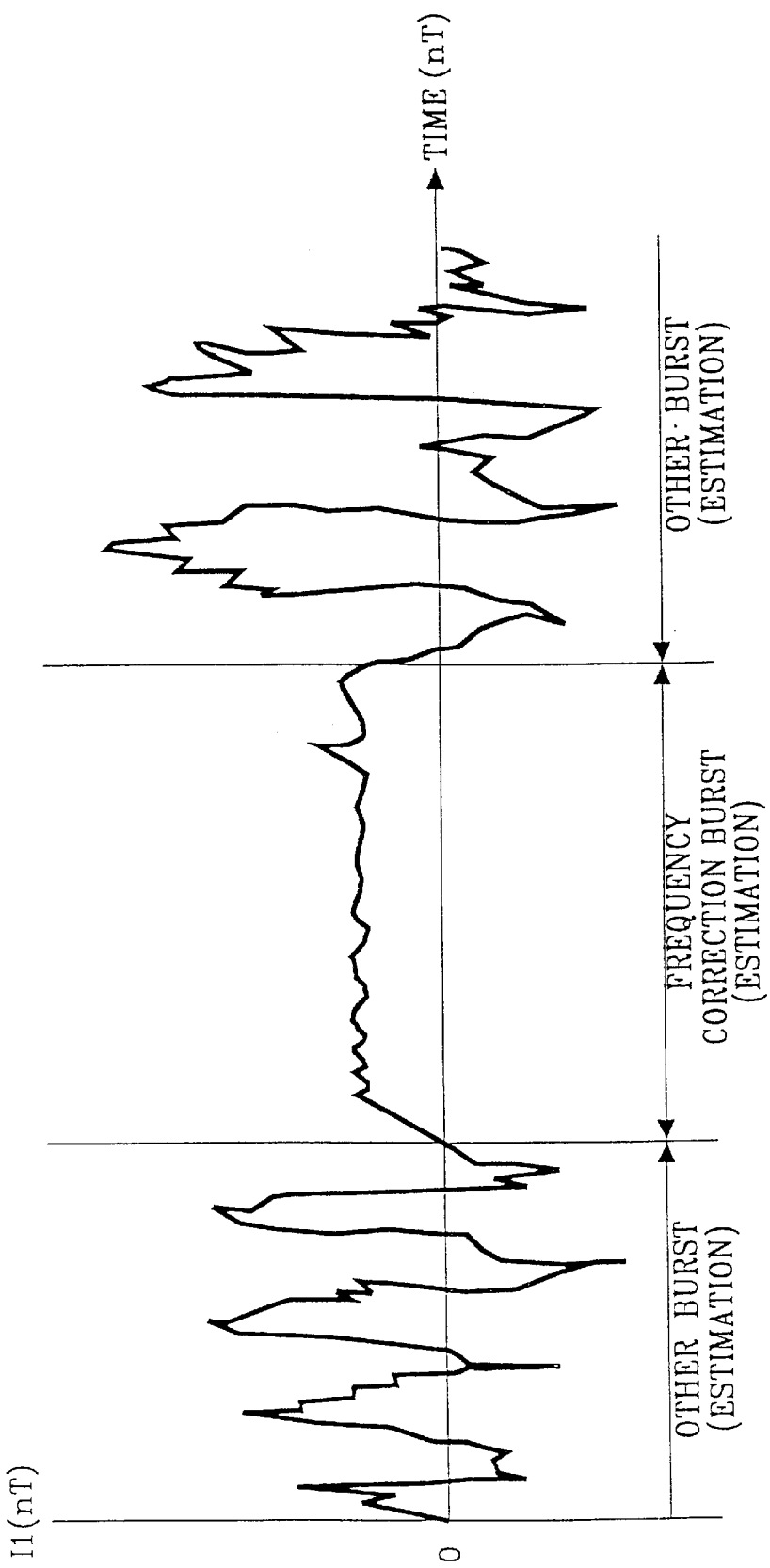
FIGS. 3A to 3D are waveform diagrams of all circuit components as shown in FIG. 2.
Figure 3B:
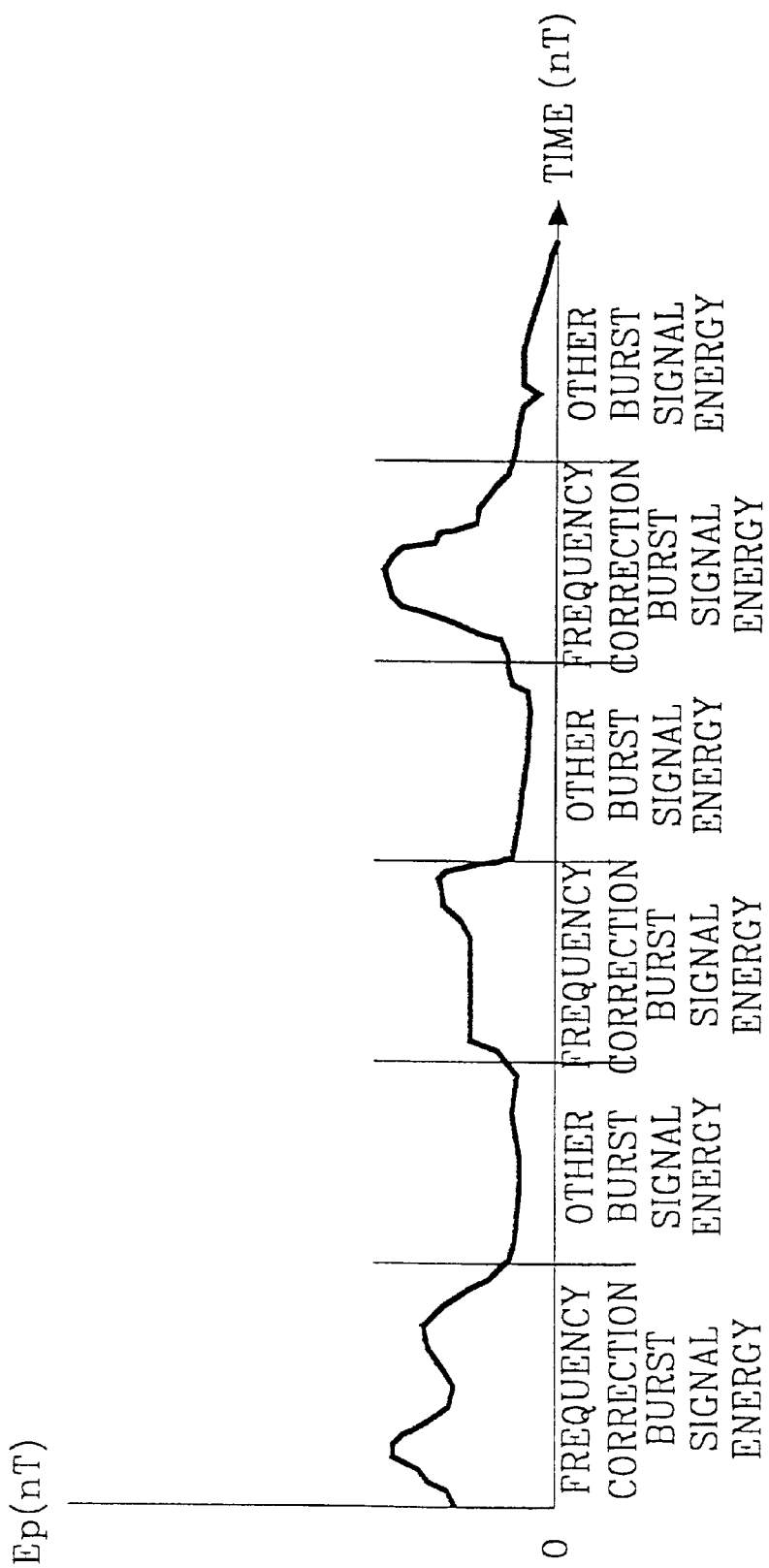
Figure 3C:
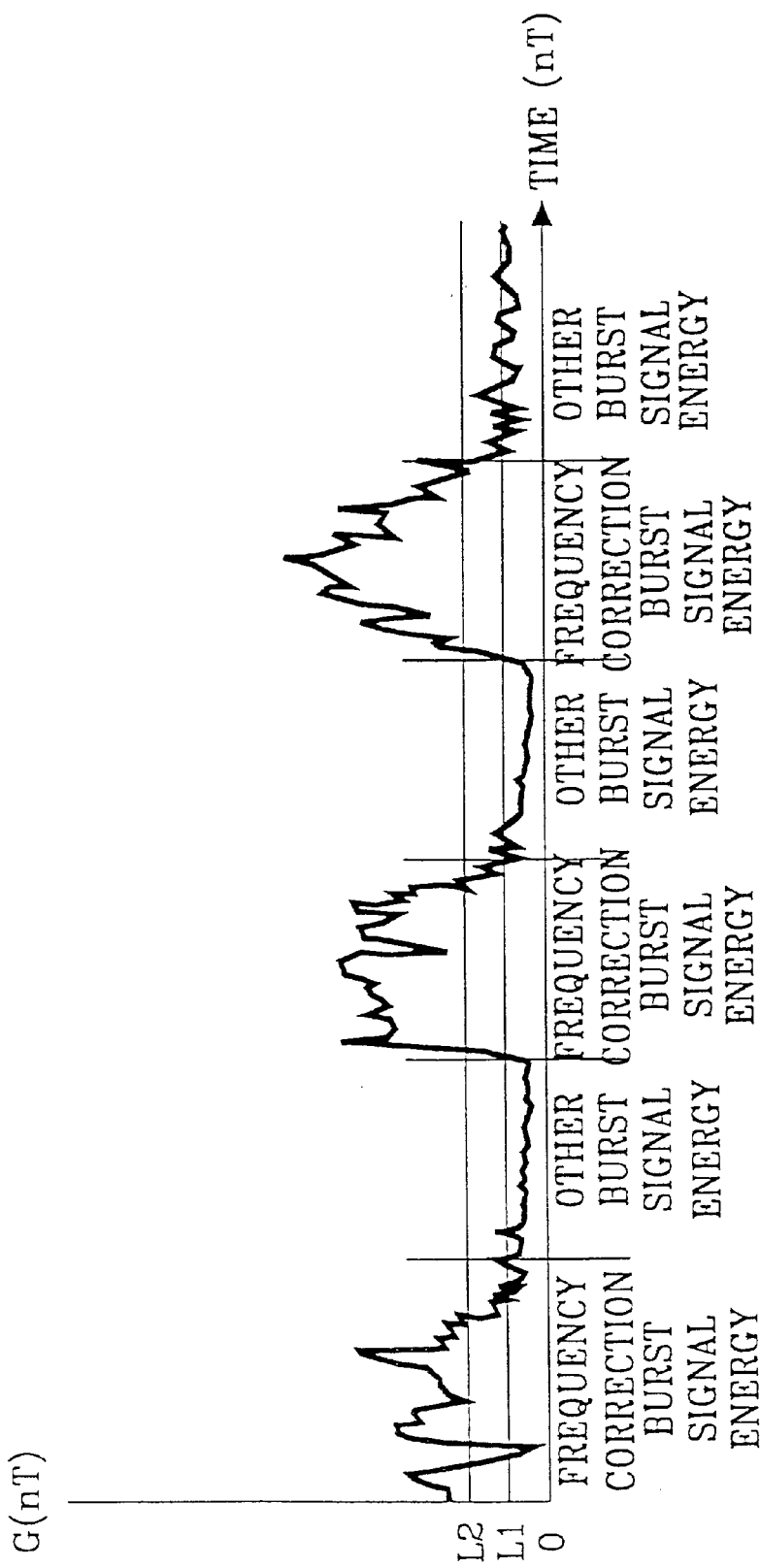
Figure 3D:
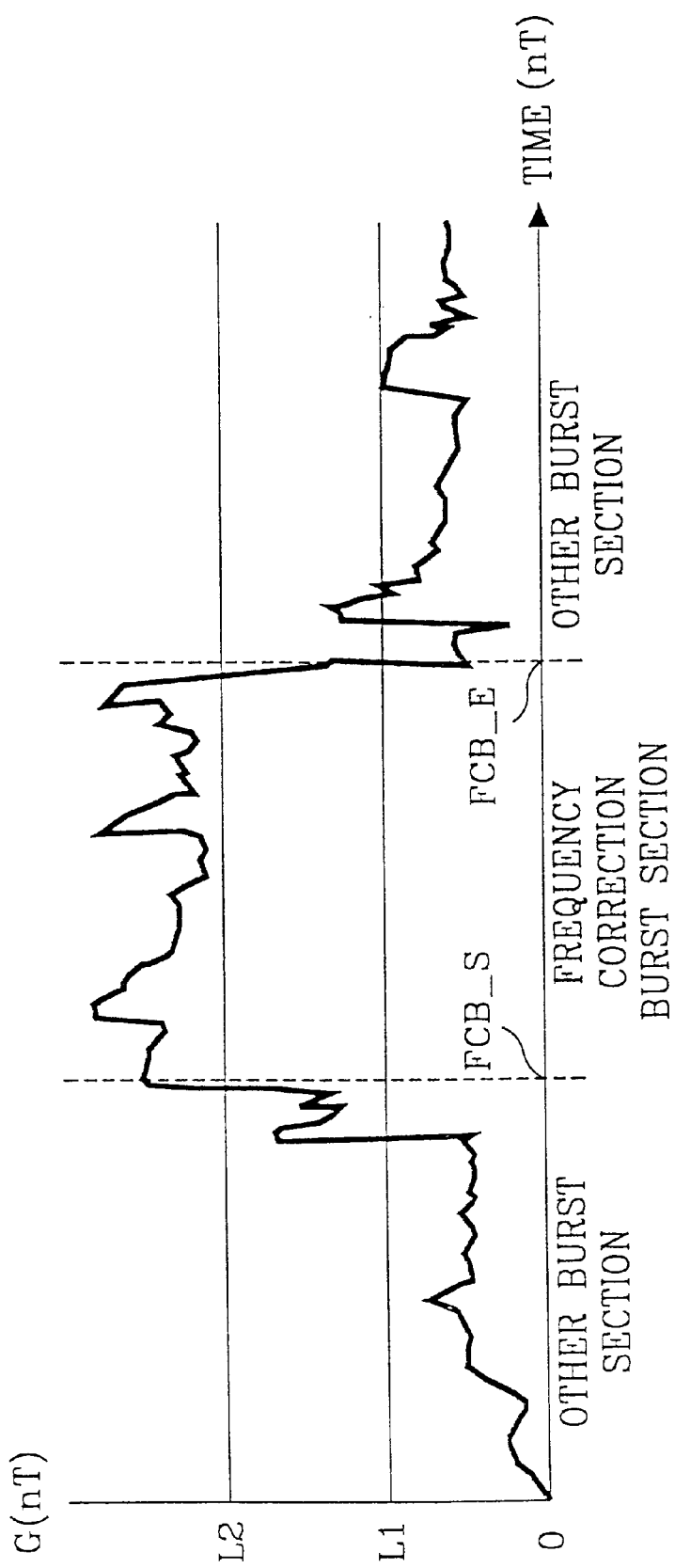

FIGS. 3A to 3D are waveform diagrams illustrating operations of all components in FIG. 2 according to an embodiment of the present invention. In particular, FIG. 3A illustrates a waveform of the first multiplied signal I1(nT) generated by the first multiplier 1 of the circuit as shown in FIG. 2. FIG. 3B illustrates a waveform of the first instantaneous signal energy Ep(nT) generated by the first energy estimation block 5 of the circuit as shown in FIG. 2. FIG. 3C illustrates a waveform of the normalized signal G(nT) generated by the normalization block 7 of the circuit as shown in FIG. 2, and FIG. 3D illustrates a waveform magnification of the normalized signal G(nT).

Figure 4A:
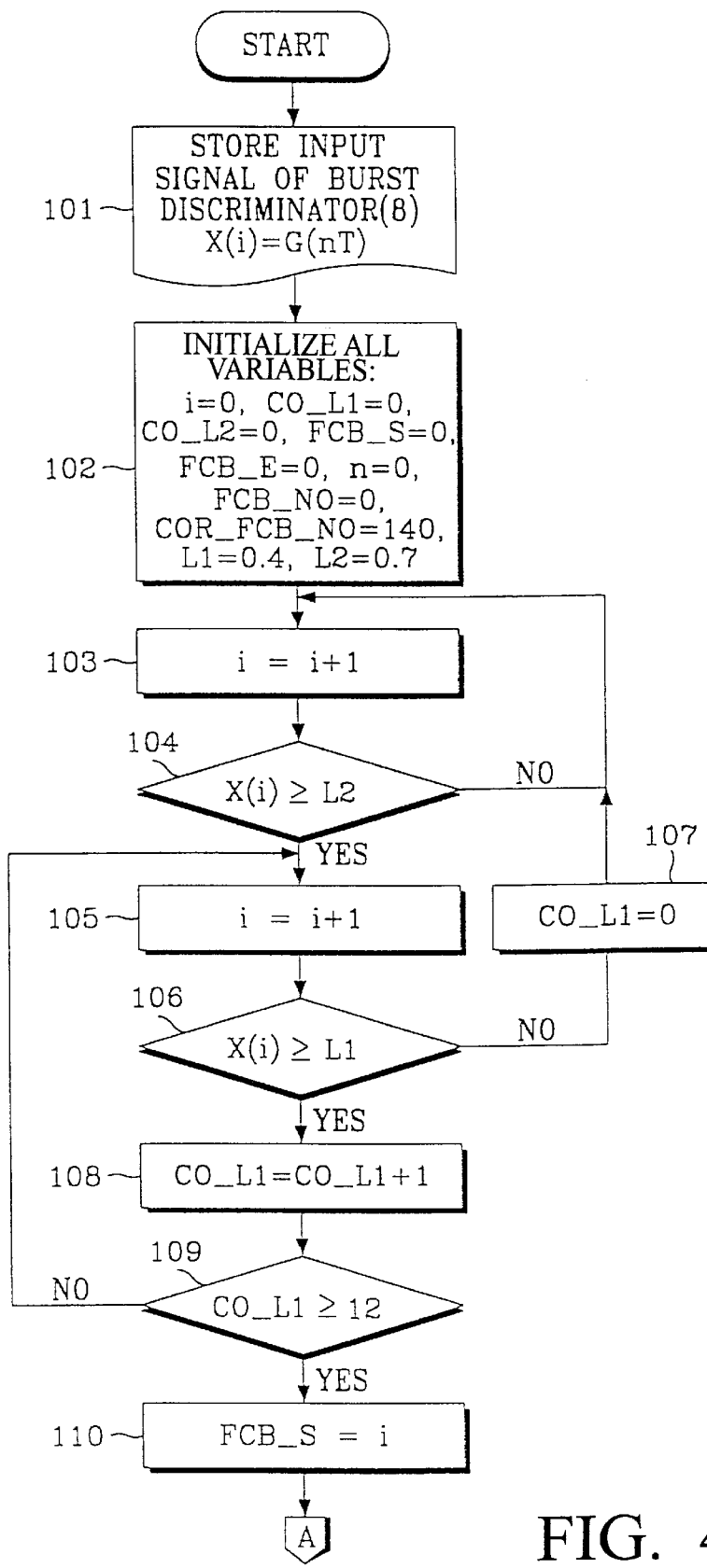
FIGS. 4A and 4B are flow charts illustrating a control procedure for detecting a frequency correction burst according to the principles of the present invention.
Figure 4B:
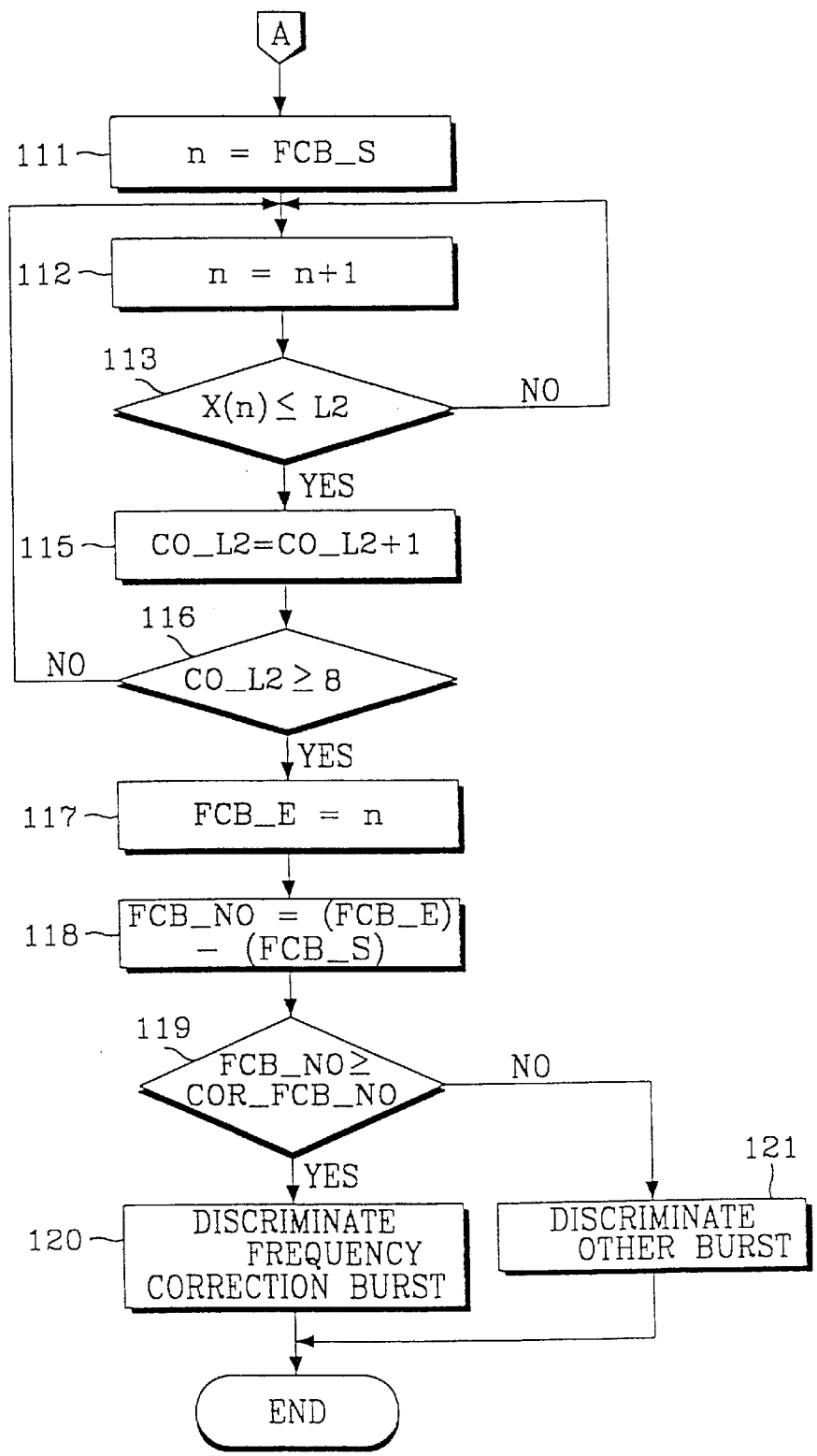

FIGS. 4A and 4B are flow charts illustrating a control procedure for detecting a frequency correction burst in a TDMA digital mobile communication system according to the principles of the present invention.

Referring to FIGS. 2 to 4A and 4B, the operation according to the preferred embodiment of the present invention will now be described in detail hereinbelow.

The input signals I(nT) and Q(nT) are baseband digital signals modulated by the continuous phase shift key through the antenna of the mobile station, a duplexer, the RF receiver and an analog to digital (A/D) converter. The signals may correspond to signals of the frequency correction burst periodically transmitted from the base station for the frequency synchronization between the base station and the mobile station and of other bursts. The signals include the multiple path fading of the mobile communication channel and an additive white gaussain noise.

The frequency generator 3 generates frequency $f_{cb}$ having a sine wave period of the frequency correction burst. The first multiplier 1 inputs the I channel data modulated by the continuous phase shift key and multiplies the input I channel data by the sine wave frequency of the frequency correction burst to produce a first multiplied signal I1(nT) having the frequency correction burst signal and the other burst signals as shown in FIG. 3A. The second multiplier 2 inputs the Q channel data modulated by the continuous phase shift key and multiplies the input Q channel data by the sine wave frequency of the frequency correction burst to produce a second multiplied signal Q1(nT). Since the Q channel signal is similar to the I channel signal except for the phase difference of 90 degrees, the Q channel signal is not shown. The signal I1(nT), corresponding to the frequency correction burst as shown in FIG. 3A, belongs to direct current (DC) composition mixed with the frequency tolerance of the local oscillator used in RF receiver, the doppler shift frequency generated by the speed of the mobile station and the additive white gaussain noise. However, the other burst signals except for the frequency correction bursts almost show a wave form indicative of optional periodic characteristic. The low pass filter 4 lowpass filters the signals I1(nT) and Q1(nT) to produce the signals I2(nT) and Q2(nT). At this time, a cut-off frequency $f_{cut}$ of the low pass filter 4 is calculated by following equation (4).

$$f_{cut}=(r)f_{LO}+f_D \qquad (4)$$

Here, "r" represents a tolerance of the local oscillator frequency of the RF receiver, $f_{LO}$ is a local oscillator frequency and $f_D$ is a doppler shift frequency. The first energy estimation block 5 estimates the energies of the signals I2(nT) and Q2(nT) output from the low pass filter 4 to produce the first instantaneous signal energy $E_p(nT)$ as shown in FIG. 3B. The first instantaneous signal energy $E_p(nT)$ is calculated by following equation (5).

$$E_p(nT)=[I2(nT)]^2+[Q2(nT)]^2 \qquad (5)$$

Likewise, the second energy estimation block 6 estimates the energies of the signals I1(nT) and Q1(nT) to produce the second instantaneous signal energy $E_q(nT)$. Similarly, the second instantaneous signal energy $E_q(nT)$ may be calculated by following equation (6).

$$E_q(nT)=[I1(nT)]^2+[Q1(nT)]^2 \qquad (6)$$

At this time, it is difficult to discriminate the frequency correction burst from the other bursts by estimating the signal $E_p(nT)$ due to the multiple path fading characteristics of the mobile station as shown in FIG. 3B. Accordingly, in order to detect only the frequency correction burst, the normalization block 7 normalizes the first instantaneous signal energy $E_p(nT)$ output from the first energy estimation 5 to the second instantaneous signal energy $E_q(nT)$ output from the second energy estimation block 6 in order to generate a normalized signal G(nT) as shown in FIG. 3C. This normalized signal G(nT) is then transmitted to the burst discriminator 8 for frequency correction burst discrimination. The waveform as shown in FIG. 3D represents a magnification of the normalized signal G(nT) generated from the normalization block 7. The burst discriminator 8 then detects only the frequency correction burst from the signal G(nT) normalized by the normalization block 7.

Referring to FIGS. 4A and 4B the operation of the burst discriminator 8 for detecting the frequency correction burst from the normalized signal G(nT) will be explained as follows. In step 101, the normalized signal G(nT) from the normalization block 7 is stored in the burst discriminator (8) and the stored signal denotes X(i) where "i" is larger than 150. After the normalized signal is stored at step 101, all variables are initialized at step 102 such as i=0, CO_L1=0, CO_L2=0, FCB_S=0, FCB_E=0, n=0, FCB_NO=0, COR_FCB_NO=140, L1=0.4 and L2=0.7.

Here, FCB_S represents a time index discriminated by a frequency correction burst start, FCB_E represents a time index discriminated by a frequency correction burst end, and FCB_NO calculated by (FCB_E)—(FCB_S) denotes a frequency correction burst length. COR_FCB_NO represents a burst length base value for discriminating the frequency correction burst, and L1 and L2 are base values of the signal energy G(nT) for discriminating the frequency correction burst start/end time indexes and are indicated by L1>L2. CO_L1 is a tentative variable for discriminating the frequency correction burst start time index, and CO_L2 is a tentative variable for discriminating the frequency correction burst end time index. Lastly, "n" is a tentative variable substituted for FCB_S and FCB_E.

In step 103, the index "i" for storing the normalized signal is increased by one (1). After step 103, it is determined whether X(i) is equal to or greater than L2 or at step 104. If X(i) is less than L2, "i" is continually increased until X(i) is equal to L2 or greater than. Otherwise, the index "i" for storing the normalized signal is again increased by one (1) at step 105. Then, in step 106, it is determined whether X(i) is equal to L1 or greater than. If it is determined that X(i) is less than L1, the tentative variable CO_L1 for discriminating the frequency correction burst start time index is initialized to zero (0) at step 107 and proceeds to step 103. On the contrary, if it is determined that X(i) is equal to or greater than L1 or more, the tentative variable CO_L1 for discriminating the frequency correction burst start time index is increased by one (1) at step 108. Then, in step 109, it is determined whether the tentative variable CO_L1 is equal to 12 or more. If it is determined that the tentative variable CO_L1 for discriminating the frequency correction burst start time index is less than 12, step 105 is repeated. On the contrary, if it is determined that the tentative variable CO_L1 is equal to 12 or more, the time index FCB_S discriminated by the frequency correction burst start is set to "i" at step 110. The time index FCB_S is set with n in step 111 and n is increased by one in step 112. Then, in step 113, it is determined whether X(n) is equal to or less than L2. If it is determined that X(n) is more than L2, step 112 is repeated. On the contrary, if it is determined that X(n) is equal to or less than L2, the tentative variable CO_L2 for discriminating the frequency correction burst end time index is increased by one (1) at step 115.

Next, it is determined whether the tentative variable CO_L2 for discriminating the frequency correction burst end time index is equal to or greater than 8 at step 116. At this time, if it is determined that the tentative variable CO_L2 is less than 8, step 112 is repeated. On the contrary, if it is determined that the tentative variable CO L2 equals 8 or more, the time index FCB_E discriminated by the frequency correction burst end is set to "n" at step 117. Then, the frequency correction burst length FCB_NO is detected by FCB_E-FCB_S at step 118. Then, in step 119, it is checked whether the frequency correction burst length FCB_NO is equal to or greater than the burst length base value COR_FCB_NO for discriminating the frequency correction burst. If it is less than the value COR_FCB_NO, the other burst is discriminated in step 121. On the contrary, if it is equal to the value COR_FCB_NO, the frequency correction burst signal is discriminated in step 120.

As described above, the signal energy of the frequency correction burst according to the principles of the present invention is definitely discriminated from the signal energy of the other burst and is detected, even in the multiple path fading environment of the mobile communication channel, and the frequency tolerance of the local oscillator used in the RF receiver and the doppler shift frequency generated by the speed of the mobile station are considered so that outer band noise having an effect on the frequency correction burst can be minimized.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A circuit for detecting a frequency correction burst contained in a digital signal comprising I-channel data and Q-channel data, said circuit comprising:

a first multiplier, coupled to receive I-channel data modulated by a continuous phase shift key, for multiplying said I-channel data by a sine wave frequency of the frequency correction burst to produce a first channel signal;

a second multiplier, coupled to receive Q-channel data modulated by said continuous phase shift key, for multiplying said Q-channel data by the sine wave frequency of the frequency correction burst to produce a second channel signal;

a low-pass filter for filtering the first and second channel signals to produce first and second filtered channel signals, respectively;

a first energy estimation unit for estimating energies of said first and second filtered channel signals to produce a first instantaneous signal energy;

a second energy estimation unit for estimating energies of said first and second filtered channel signals to produce a second instantaneous signal energy;

a normalization unit for normalizing said first instantaneous signal energy to said second instantaneous signal energy to produce a normalized signal; and a burst discriminator for detecting the frequency correction burst from said normalized signal.

2. The circuit of claim 1, wherein said burst discriminator detects the frequency correction burst by:

detecting a frequency correction burst start time index from said normalized signal;

detecting a frequency correction burst end time index from said normalized signal;

subtracting the frequency correction burst start time index from the frequency correction burst end time index to produce a frequency correction burst length; and comparing the frequency correction burst length with a base frequency correction burst length to discriminate said frequency correction burst from said normalized signal.

3. The circuit of claim 1, wherein said frequency correction burst is discriminated from said normalized signal when the frequency correction burst length is longer than said base frequency correction burst length.

4. The circuit of claim 3, wherein other bursts contained in said normalized signal are discriminated from said normalized signal when the frequency correction burst length is less than said base frequency correction burst length.

5. The circuit of claim 1, wherein said low-pass filter has a cut-off frequency that is characterized by the following equation: $f_{cut}=(r)f_{LO}+f_D$, wherein (r) represents a tolerance of a local oscillator frequency of a receiver, $f_{Lo}$ corresponds to a local oscillator frequency and $f_D$ corresponds to a doppler shift frequency.

6. The circuit of claim 1, wherein said first energy estimation unit estimates the first instantaneous signal energy from the first and second filtered channel signals by combining the square of each of the first and second filtered channel signals.

7. The circuit of claim 6, wherein said second energy estimation unit estimates the second instantaneous signal energy from the first and second channel signals by combining the square of each of the first and second channel signals.

8. A method for detecting a frequency correction burst contained in a digital signal comprising I and Q channel data, said method comprising the steps of:

receiving I and Q channel data modulated by a continuous phase shift key and multiplying said I and Q channel data by a sine wave frequency of a frequency correction burst to produce first and second channel signals, respectively;

low-pass filtering said first and second channel signals to produce first and second filtered channel signals, respectively;

estimating energies of said first and second filtered channel signals to produce a first instantaneous signal energy;

estimating energies of said first and second channel signals to produce a second instantaneous signal energy;

normalizing said first instantaneous signal energy to said second instantaneous signal energy to produce a normalized signal; and detecting a frequency correction burst from said normalized signal.

9. The method of claim 8, wherein said step of detecting the frequency correction burst comprises:

detecting a frequency correction burst start time index from said normalized signal;

detecting a frequency correction burst end time index from said normalized signal;

subtracting the frequency correction burst start time index from the frequency correction burst end time index to produce a frequency correction burst length; and comparing the frequency correction burst length with a base frequency correction burst length to discriminate said frequency correction burst from said normalized signal.

10. The method of claim 8, wherein said frequency correction burst is discriminated from said normalized signal when the frequency correction burst length is longer than said base frequency correction burst length.

11. The method of claim 10, wherein other bursts contained in said normalized signal are discriminated from said normalized signal when the frequency correction burst length is less than said base frequency correction burst length.

12. The method of claim 8, wherein said first instantaneous signal energy is estimated from the first and second filtered channel signals by combining the square of each of the first and second filtered channel signals.

13. The method of claim 12, wherein said second instantaneous signal energy is estimated from the first and second channel signals by combining the square of each of the first and second channel signals.

14. A circuit for detecting a frequency correction burst contained in a digital signal comprising first and second channel data, said circuit comprising:

means for receiving said digital signal comprising first and second channel data;

means for multiplying said first and second channel data by a sine wave frequency of the frequency correction burst to produce first and second channel signals;

low-pass filter means having a cut-off frequency for low-pass filtering the first and second channel signals to produce first and second filtered channel signals, respectively;

energy estimation means for estimating energies of said first and second filtered channel signals to generate a first instantaneous signal energy, and for estimating energies of said first and second channel signals to generate a second instantaneous signal energy; and burst detection means for normalizing said first instantaneous signal energy to said second instantaneous signal energy to produce a normalized signal, and for detecting the frequency correction burst from said normalized signal.

15. The circuit of claim 14, wherein said burst detection means detects the frequency correction burst by:

detecting a frequency correction burst start time index from said normalized signal;

detecting a frequency correction burst end time index from said normalized signal;

subtracting the frequency correction burst start time index from the frequency correction burst end time index to produce a frequency correction burst length; and comparing the frequency correction burst length with a base frequency correction burst length to discriminate said frequency correction burst from said normalized signal.

16. The circuit of claim 15, wherein said frequency correction burst is discriminated from said normalized signal when the frequency correction burst length is longer than said base frequency correction burst length.

17. The circuit of claim 16, wherein other bursts contained in said normalized signal are discriminated from said normalized signal when the frequency correction burst length is less than said base frequency correction burst length.

18. The circuit of claim 16, wherein said low-pass filter means has said cut-off frequency characterized by the following equation: $f_{cut}=(r)f_{LO}+f_D$, wherein (r) represents a tolerance of a local oscillator frequency of a receiver, $f_{LO}$ corresponds to a local oscillator frequency and $f_D$ corresponds to a doppler shift frequency.

19. The circuit of claim 14 wherein said energy estimation means estimates the first instantaneous signal energy from the first and second filtered channel signals by combining the square of each of the first and second filtered channel signals.

20. The circuit of claim 19, wherein said energy estimation means estimates the second instantaneous signal energy from the first and second channel signals by combining the square of each of the first and second channel signals.

* * * * *